United States Patent
Zheng

(10) Patent No.: US 10,270,782 B2
(45) Date of Patent: Apr. 23, 2019

(54) VIRTUAL DESKTOP ACCESS CONTROL

(71) Applicant: HANGZHOU H3C TECHNOLOGIES CO., LTD., Zhejiang (CN)

(72) Inventor: Xiongkai Zheng, Zhejiang (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 50 days.

(21) Appl. No.: 15/122,301

(22) PCT Filed: Mar. 4, 2015

(86) PCT No.: PCT/CN2015/073596
§ 371 (c)(1),
(2) Date: Aug. 29, 2016

(87) PCT Pub. No.: WO2015/131811
PCT Pub. Date: Sep. 11, 2015

(65) Prior Publication Data
US 2016/0373459 A1   Dec. 22, 2016

(30) Foreign Application Priority Data

Mar. 4, 2014 (CN) .......................... 2014 1 0077230

(51) Int. Cl.
*H04L 29/06* (2006.01)
*H04L 9/32* (2006.01)
*G06F 21/62* (2013.01)

(52) U.S. Cl.
CPC ........ *H04L 63/105* (2013.01); *G06F 21/6209* (2013.01); *H04L 9/32* (2013.01);
(Continued)

(58) Field of Classification Search
None
See application file for complete search history.

(56) References Cited

U.S. PATENT DOCUMENTS 7,246,174 B2 *   7/2007   Sciandra ................. G06F 9/505
                                                       709/203
8,468,455 B2 *   6/2013   Jorgensen ................ G06F 9/54
                                                       715/733
(Continued)

FOREIGN PATENT DOCUMENTS

CN   101764798 A   6/2010
CN   102025535 A   4/2011
(Continued)

OTHER PUBLICATIONS

International Search Report and Written Opinion, International Application No. PCT/CN2015/073596, dated May 26, 2015, pp. 1-8, SIPO.

*Primary Examiner* — Farid Homayounmehr
*Assistant Examiner* — Olanrewaju J. Bucknor
(74) *Attorney, Agent, or Firm* — Brooks, Cameron & Huebsch, PLLC

(57) ABSTRACT

A virtual desktop access control is disclosed. A gateway apparatus receives a virtual desktop access request from a client, obtains a virtual desktop access policy according to a source address of the virtual desktop access request, and determines a virtual switch according to a destination address of the virtual desktop access request, wherein the destination address is an address of a virtual desktop that is connected to the virtual switch. The gateway apparatus sends the virtual desktop access policy to the virtual switch, such that the virtual switch is allowed to control a level of access which the virtual desktop has to access network resources. The gateway apparatus forwards the virtual desktop access request to the virtual desktop, receives a response to the virtual desktop access request from the virtual desktop, and forwards the response to the client.

14 Claims, 5 Drawing Sheets

(52) U.S. Cl.
CPC ............ *H04L 63/101* (2013.01); *H04L 63/20* (2013.01); *G06F 2221/2141* (2013.01); *H04L 65/1069* (2013.01)

(56) References Cited

U.S. PATENT DOCUMENTS

| | | | | |
|---|---|---|---|---|
| 8,543,696 | B1* | 9/2013 | Williamson | H04L 63/168 709/224 |
| 8,769,127 | B2* | 7/2014 | Selimis | H04L 67/06 709/223 |
| 9,467,305 | B2* | 10/2016 | Ringdahl | H04L 12/4641 |
| 2009/0216975 | A1* | 8/2009 | Halperin | G06F 9/45537 711/162 |
| 2009/0276771 | A1* | 11/2009 | Nickolov | G06F 9/4856 717/177 |
| 2010/0325284 | A1* | 12/2010 | Heim | H04L 67/141 709/227 |
| 2011/0113472 | A1* | 5/2011 | Fung | H04L 63/0227 726/3 |
| 2011/0153716 | A1* | 6/2011 | Malakapalli | G06F 9/4445 709/203 |
| 2011/0153853 | A1 | 6/2011 | London et al. | |
| 2011/0184993 | A1* | 7/2011 | Chawla | G06F 9/45533 707/802 |
| 2011/0185398 | A1* | 7/2011 | Kubota | G06F 21/41 726/3 |
| 2012/0054744 | A1* | 3/2012 | Singh | G06F 21/53 718/1 |
| 2013/0007465 | A1* | 1/2013 | Movassaghi | H04L 63/105 713/186 |
| 2013/0103841 | A1* | 4/2013 | Werth | G06F 9/5072 709/227 |
| 2013/0103973 | A1* | 4/2013 | Werth | G06F 9/4446 714/2 |
| 2013/0311990 | A1* | 11/2013 | Tang | G06F 9/45558 718/1 |
| 2013/0346576 | A1 | 12/2013 | Huang et al. | |
| 2014/0019525 | A1* | 1/2014 | Takahashi | G06F 9/4445 709/203 |
| 2014/0188977 | A1* | 7/2014 | Song | H04L 67/10 709/203 |
| 2014/0258450 | A1* | 9/2014 | Suryanarayanan | H04L 67/1097 709/217 |

FOREIGN PATENT DOCUMENTS

| | | |
|---|---|---|
| CN | 102571698 A | 7/2012 |
| CN | 102577315 A | 7/2012 |
| CN | 102707985 A | 10/2012 |
| CN | 102811239 | 12/2012 |

* cited by examiner

VIRTUAL DESKTOP ACCESS CONTROL

BACKGROUND

A virtual desktop is a virtualization technology. Virtual desktops may simulate software, a hardware system, or a combination of both. For example, a virtual desktop may simulate conventional desktop computer. A virtual desktop may be hosted on a server or in a cloud computing environment and a user may use a client device to log into the virtual desktop remotely.

It is possible to host a plurality of virtual desktops on a single physical computing device, such as a server. Each of the plurality of virtual desktops may operate just like a real computer. For example, an operating system and applications may be installed on each virtual desktop, and each virtual desktop may access network resources. From the user's point of view, the virtual desktop is an application running on a physical computer; however, for the applications running in a virtual desktop, the virtual desktop appears to be a real computer.

BRIEF DESCRIPTION OF DRAWINGS

Features of the present disclosure are illustrated by way of an example and not limited in the following figure(s), in which like numerals indicate like elements, in which.

DETAILED DESCRIPTION

For simplicity and illustrative purposes, a disclosure is described by referring mainly to an example thereof. In the following description, numerous specific details are set forth in order to provide a thorough understanding of the disclosure of the application. It will be readily apparent however, that the disclosure may be practiced without limitation to these specific details. In other instances, some methods and structures have not been described in detail so as not to unnecessarily obscure the disclosure. As used herein, the terms "a" and "an" are intended to denote at least one of a particular element, the term "includes" means includes but not limited to, the term "including" means including but not limited to, and the term "based on" means based at least in part on.

In recent years, many corporations have introduced virtual desktops for employees. This enables settings and data stored on the employee's virtual desktop to be stored in a data center or a private cloud. The employee can log into and use the virtual desktop from a client computer, such as a physical desktop in the office, a notebook computer or other desktop computer outside of the office. The employee may thus login to their virtual desktop from a variety of different locations and/or from different client devices, but be provided with a similar user experience due to the settings and data stored in the virtual desktop.

However, corporate trade secrets and sensitive information are stored in the corporate network and information technology (IT) systems. Thus, information security becomes an issue if employees are allowed to use different clients to login to the virtual desktops from different locations. For example, when a R&D personnel accesses a virtual desktop from a client device within the R&D department, it may be desired to give the R&D personnel a high level of access policy such that they can access R&D resources on the server or network which require a certain level of access policy. However, if the same R&D personnel accesses the virtual desktop from a client located in a non-R&D department, it may be desired to prevent them from accesses such resources.

In an example of the present disclosure, a gateway apparatus controls an access policy of the virtual desktop to network resources based on different access scenarios. This may help to keep sensitive information stored on the corporate network safe.

Figure 1:
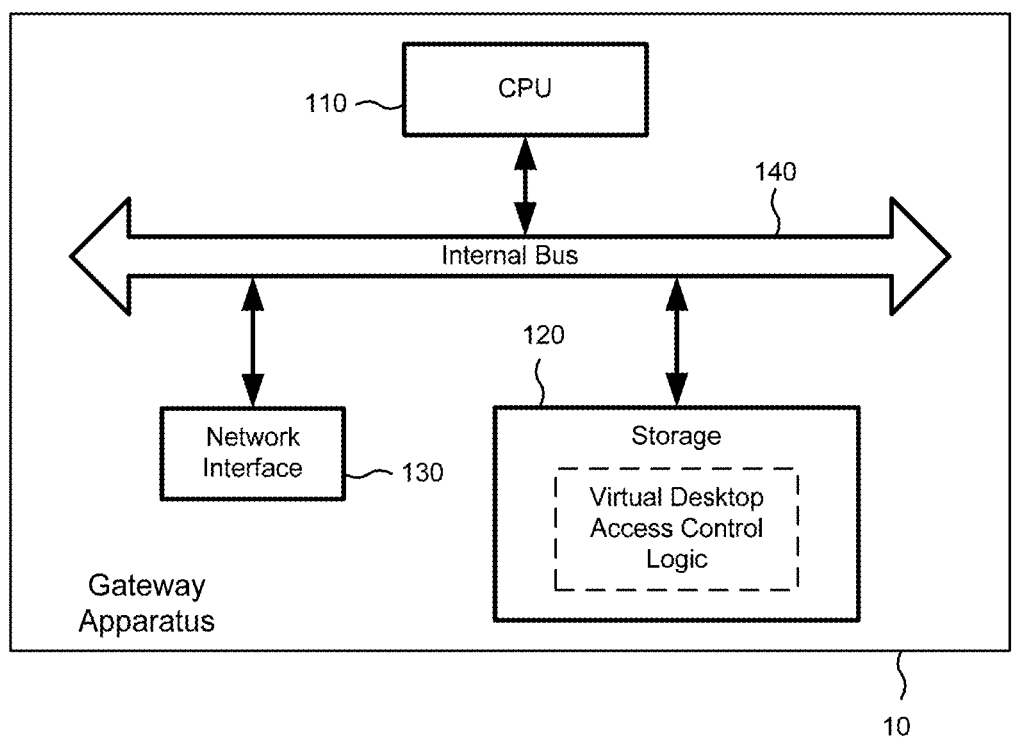
FIG. 1 is a hardware architecture diagram of a gateway apparatus according to an example of the present disclosure.

In an example, a gateway apparatus may include hardware architecture as shown in FIG. 1. The gateway apparatus 10 may include a processor such as a central processing unit (CPU) 110, a computer readable storage medium 120, and a network interface 130. These elements may be connected to each other through an internal bus 140.

In some examples, the client's access to the virtual desktop is performed through the gateway apparatus, wherein the gateway apparatus acts as a proxy for receiving and forwarding the requests and responses between the clients and the virtual desktops which are to be accessed. In examples of the present disclosure, the gateway apparatus may be a dedicated proxy apparatus for implementing virtual desktop's access, or can be a device for receiving and forwarding other additional information or packets. Virtual desktop access control logic running in the gateway apparatus may control access of the virtual desktop to network resources.

The CPU 110 can communicate with the computer readable storage medium 120, and is capable of reading and executing the machine readable instructions stored in the computer readable storage medium 120 so as to implement an access control function relating to the virtual desktop.

The computer readable storage medium 120 can be any electronic, magnetic, optical, or other physical storage devices, can contain or store information, such as executable instructions, data, and so on. For example, the computer readable storage medium 120 may be: RAM (Random Access Memory), dynamic memory, non-volatile memory, flash memory, storage drives (such as hard disk drives), solid hard drive, any type of storage disks (such as CD, DVD, etc.), or similar storage medium, or a combination thereof. Additionally, any computer readable storage medium 120 described in the present disclosure may be non-transitory.

Figure 2:
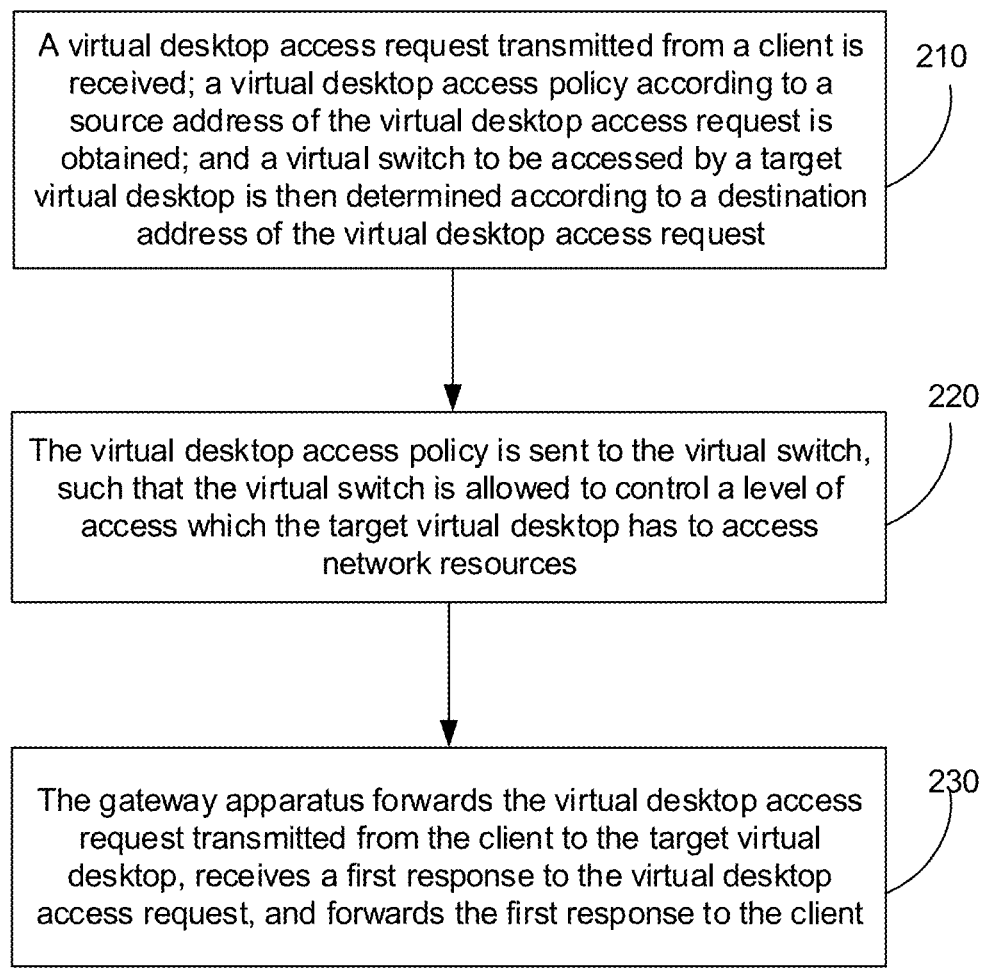
FIG. 2 is a flowchart illustrating the procedures of a virtual desktop access method according to an example of the present disclosure.

In an example of the present disclosure, the CPU 110 of the gateway apparatus 10 may read and execute the virtual desktop access control logic in the computer readable storage medium 120, and example operating procedures are shown in FIG. 2.

Referring to FIG. 2, at block 210, a virtual desktop access request transmitted from a client is received. A virtual desktop access policy according to a source address of the virtual desktop access request is obtained. A virtual switch to be accessed by a target virtual desktop is then determined according to a destination address of the virtual desktop access request.

The virtual desktop access requests transmitted from the client may vary depending on the protocols adopted between the client and the virtual desktop. For example, for a RDP (Remote Desktop Protocol), the virtual desktop access request can be a RDP connection request. For a SPICE (Simple Protocol for Independent Computing Environment), the virtual desktop access request can be a SPICE connection request. Furthermore, the source address of the virtual desktop access request may include the address of the client which initiates the access request. Meanwhile, the destination address may include the address of the virtual desktop to be accessed.

The address of the client may reflect the client's access scenario. For example, the MAC (Media Access Control) address and the static IP (Internet Protocol) address of the client usually represent a terminal device used by a user. The dynamic IP address that the client obtained from a DHCP (Dynamic Host Configuration Protocol) server can reflect the access area of the client, which represents the network area where the DHCP server perform address configuration. If the DHCP server has other rules fin performing address configuration, the IP address of the client and the rules can be used for identifying more access scenario information. Hence, by using the address configuration of the client and the access policy corresponding to the client's address, access control for different access scenarios can be implemented.

In this example, the virtual desktop access policy of the client has a relationship with the source address of the virtual desktop access request transmitted from the client (or the address of the client). Therefore, a network system administrator may configure the relationship between the source address and the virtual desktop access policy in advance. The relationship may be stored in the local gateway apparatus or other network nodes that are available to the gateway apparatus. In another example, a network management software may automatically generate the relationship between the source address and the virtual desktop access policy based on a predetermined rule, which can be stored in the local gateway apparatus or other network nodes that are available to the gateway apparatus. In another example, the gateway apparatus may obtain the virtual desktop access policy of the source address based on the source address of the virtual desktop access request and a predetermined rule. However, these are just examples and the present disclosure is not limited thereto. The source address of the virtual desktop access request may for example, be a source MAC address, a source IP address, or a combination thereof.

Security requirements of actual network environments and configuration rules of client's address can be used for configuring or generating various virtual desktop access authorities, however the present disclosure is not limited thereto. For example, in a network environment providing both Ethernet interface access and Wi-Fi access, if employees are allowed to access an enterprise's sensitive data by using computer terminals via Ethernet interface and certified mobile devices, different IP address pools can be assigned to the devices which access the network via Ethernet interface and devices which access the network via Wi-Fi. For instance, the IP address pools that are assigned to the devices which access via Ethernet interface may have a higher level access policy, and the MAC addresses of the certified mobile devices may have a higher level access policy, while the other IP addresses may have a lower level access policy. Furthermore, if it is desired to give different devices that have the same IP address pool different access authorities, a combination of the IP address and the MAC address can be used as the source address.

The virtual desktop access policy may be sent to a virtual switch for access control, and any access control methods that can be implemented by the virtual desktop can be used as contents of the virtual desktop access policy, which is not limited in this example.

After the virtual desktop access request transmitted from the client is received, the gateway apparatus will extract the source address of the virtual desktop access request and obtain a corresponding virtual desktop access policy of the source address according to the source address of the virtual desktop access request. The gateway apparatus may extract the destination address of the virtual desktop access request to determine a virtual switch (hereinafter also referred to as a target virtual desktop), wherein the virtual desktop owns the destination address and accesses the virtual switch.

The gateway apparatus can obtain the virtual switch being accessed by the target virtual desktop through various methods. For example, the address of the virtual desktop and the corresponding relationship between the address and the virtual switch can be preserved in the gateway apparatus; or the gateway apparatus can send a request to the network management server and receive the virtual desktop to be accessed by the target virtual desktop from the network management server. This should not be a limitation of the present disclosure.

At block 220, the virtual desktop access policy is sent to the virtual switch, such that the virtual switch is allowed to control a level of access which the target virtual desktop has to access network resources.

In this example, the client can log into the virtual desktop to use network resources. After the client logged into the virtual desktop, the virtual switch is required to access the network resources. By controlling the permission of the virtual switch, the client's access to the network resource can be restricted.

The gateway apparatus will send the virtual desktop access policy that corresponds to the source address of the virtual desktop access request to the virtual switch. After the virtual desktop access policy is received, the virtual switch may control the target virtual desktop to access network resources according to the virtual desktop access policy.

At block 230, the gateway apparatus forwards the virtual desktop access request transmitted from the client to the target virtual desktop, receives a first response to the virtual desktop access request, and forwards the first response to the client.

In one example, the gateway apparatus forwards the virtual desktop access request to the virtual desktop after receiving a confirmation that the virtual switch has received the virtual desktop access policy.

After the virtual desktop access policy sent from the gateway apparatus is received, the virtual switch may configure it as an effective access control rule, and then return a successfully-configured message to the gateway apparatus. After the gateway apparatus received the successfully-configured message and learned that the virtual desktop access policy is effective, the gateway apparatus forwarded the virtual desktop access request transmitted from the client to the virtual desktop, and forwarded the first response to the client so as to build a remote connection between the client and the virtual desktop, wherein the first response is against the virtual desktop access request.

In some scenarios, the virtual desktop default access policy of the target virtual desktop can be configured on the virtual switch to be accessed by the target virtual desktop. Only when the client is under a specific access scenario (or the source address of the virtual desktop access request meets a specific condition), the corresponding virtual desktop access policy of the source address will be sent to the virtual switch; and when the client is under other access scenarios, the default access policy will be sent to the virtual switch. After the virtual desktop disconnection request transmitted by the client is received and the virtual desktop default access policy of the target virtual desktop is obtained, the gateway apparatus will send the virtual desktop default access policy to the virtual switch to be accessed by the target virtual desktop so as to make the virtual switch to recover the default authority settings. After the virtual desktop disconnection request transmitted from the client is received by the gateway apparatus, the virtual desktop disconnection request is forwarded to the target virtual desktop, and a second response is forwarded to the client so as to disconnect the client and the target virtual desktop, wherein the second response is returned by the target virtual desktop and is against the virtual desktop disconnection request. What calls for attention is that, after the virtual desktop disconnection request is received, the gateway apparatus may send the virtual desktop default access policy to the virtual switch first, and may forward the virtual desktop disconnection request and the second response afterwards; or the gateway apparatus may forward the virtual desktop disconnection request and the second response first, and may send the virtual desktop default access policy to the virtual switch afterwards; or the gateway apparatus may perform the abovementioned two processes simultaneously.

Similar to the virtual desktop access policy, the virtual desktop default access policy may be configured by the network system administrator in advance, and may be preserved in the local gateway apparatus or other network nodes that are available to the gateway apparatus; or the virtual desktop default access policy may be automatically generated by the network management software based on a predetermined rule, and may be preserved in the local gateway apparatus or other network nodes that are available to the gateway apparatus; or the gateway apparatus may obtain the virtual desktop default access policy based on the address of the target virtual desktop and a predetermined rule; however, this should not be a limitation of the present disclosure.

The virtual desktop disconnection requests transmitted by the client are different depending on the protocols adopted between the client and the virtual desktop. In one example, for RDP protocol, the virtual desktop disconnection request may be a RDP disconnection request; for SPICE protocol, the virtual desktop disconnection request may be a SPICE disconnection request.

Be noted that, when the client is allowed to log into the virtual desktop and access the virtual desktop, the login account of the client usually has an access policy to access the network resources. In this case, the virtual desktop access policy will be combined with the access policy of the login account, and the client's access to the network resources will be restricted to the virtual desktop access policy and the access policy of the login account at the same time, such that access control based on users and the access scenarios can be achieved so as to enhance information security.

Figure 3:
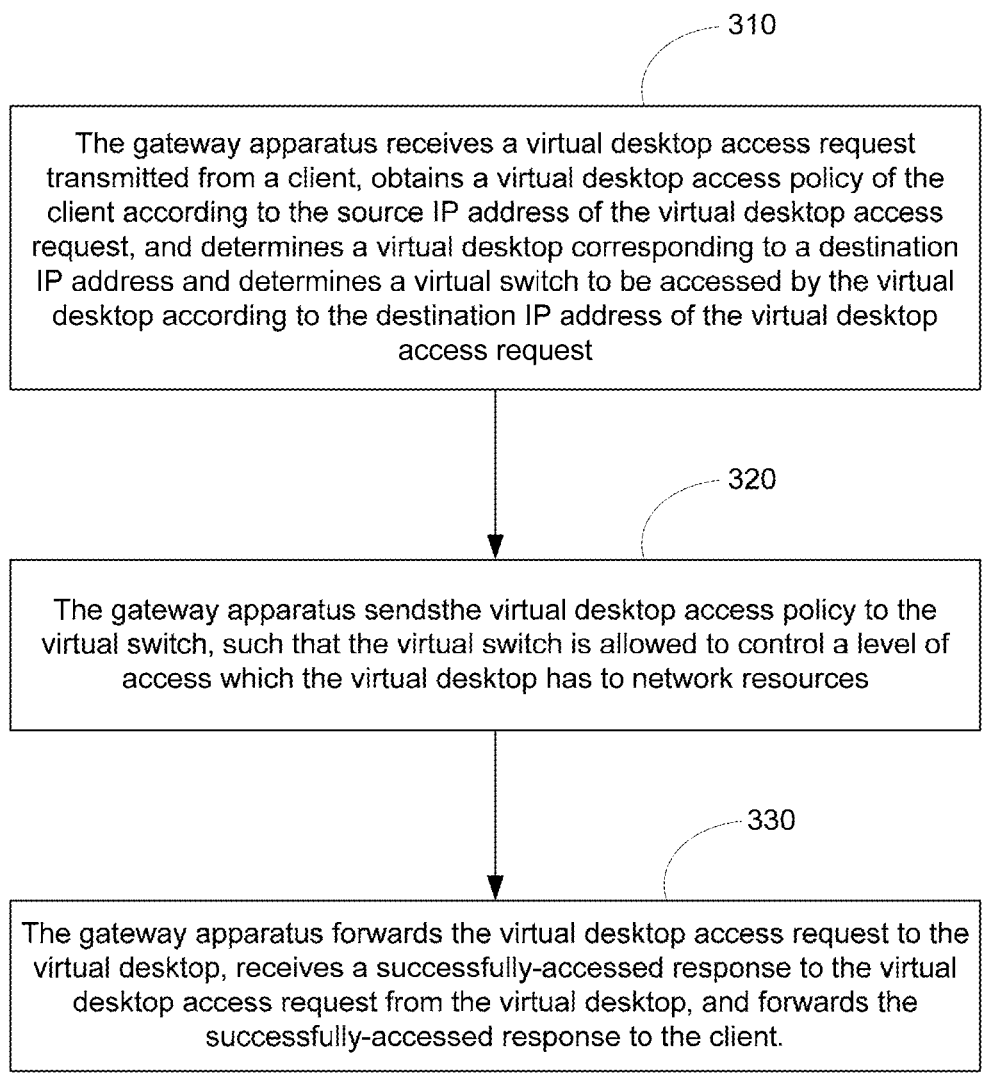
FIG. 3 is a flowchart illustrating the procedures of a virtual desktop access method according to another example of the present disclosure.

In another example of the present disclosure, the CPU 110 of the gateway apparatus 10 will read and execute the virtual desktop access control logic of the computer readable storage medium 120 to control the virtual desktop access authorities of clients in different locations, thereby increasing corporate information security. The procedures are shown in the flowchart of FIG. 3.

At block 310, the gateway apparatus receives a virtual desktop access request transmitted from a client, obtains a virtual desktop access policy of the client according to the source IP address of the virtual desktop access request, and determines a virtual desktop corresponding to a destination IP address and determines a virtual switch to be accessed by the virtual desktop according to the destination IP address of the virtual desktop access request.

At block 320, the gateway apparatus sends the virtual desktop access policy to the virtual switch, such that the virtual switch is allowed to control a level of access which the virtual desktop has to network resources.

At block 330, the gateway apparatus forwards the virtual desktop access request to the virtual desktop, receives a successfully-accessed response to the virtual desktop access request from the virtual desktop, and forwards the successfully-accessed response to the client.

In one example, the gateway apparatus forwards the virtual desktop access request to the virtual desktop after receiving a confirmation that the virtual switch has received the virtual desktop access policy.

In this example, the gateway apparatus queries and sends the corresponding virtual desktop access policy of the client to the virtual switch in order to control the virtual desktop to read/write the accessible data only, thereby controlling different access authorities depending on the accesses of different clients' virtual desktops.

The source IP address of the virtual desktop access request is the IP address of the client, and the destination IP address of the virtual desktop access request is the IP address of the virtual desktop. The gateway apparatus may obtain a corresponding virtual desktop access policy of the client according to the source IP address of the virtual desktop access request, and may determine the virtual switch to be accessed by the virtual desktop according to the destination IP address of the virtual desktop access request.

In this example, the network administrator may configure the corresponding virtual desktop access policy of the IP address in the gateway apparatus in advance. For example, the network administrator may divide the clients' access authorities in accordance with office regions or departments based on actual requirements, and may assign different IP address ranges to the clients depending on the clients' office regions or departments. For example, R&D personnel may have a higher access policy if he accesses the virtual desktop within the R&D department, and is allowed to access the authority-related server and the network resources. If the R&D personnel access the virtual desktop in a non-R&D department, he is not allowed to access the server.

The IP addresses of clients located within the same office region are usually in the same network segment. In this case, the corresponding virtual desktops of the clients having the IP addressed in the same network segment may have the same access policy, such that the access authorities for accessing virtual desktops remotely will be different depending on the regions of the clients. In one example, the network administrator may configure the corresponding relationship between the client's IP address and the virtual desktop access policy in the gateway apparatus. Accordingly, the DHCP server may be configured to assign the static IP address so as to ensure that the binding relationship between the IP address and the client.

Similarly, the network administrator may configure the corresponding relationship between the virtual desktop and the virtual switch in the gateway apparatus. Because the virtual desktop is generated and analogized by software, and its data is stored in a physical hardware, such as a hard disk of a real server. Virtual switches are used for forwarding packets when the virtual desktop is accessing data. In some actual scenarios, the virtual switch is located in the server where the virtual desktop is located in order to save hardware resources.

After that, the gateway apparatus may send the corresponding virtual desktop access policy of the client to the virtual switch. After the virtual switch receives the virtual desktop access policy, the virtual switch can control the virtual desktop to access network resources according to the virtual desktop access policy so as to control the access policy of the client. The virtual switch can control the access policy of the virtual desktop when the virtual desktop is communicating with others. If the virtual desktop has the authority to access the network resources of the destination IP address, the virtual switch won't restrict the virtual desktop's access. If the virtual desktop does not have the authority to access the network resource of the destination IP address, the virtual switch will discard the packets. Therefore, after the user login to the virtual desktop through the client, he is only allowed to access contents that are accessible by the virtual desktop access policy.

Furthermore, after the virtual desktop access policy is successfully received, the virtual switch will return a successfully-configured message. After the successfully-configured message is received, the gateway apparatus will determine that the virtual desktop access policy is successfully distributed, and then forward the virtual desktop access request transmitted from the client to the virtual desktop and forward a successfully-accessed response returned from the virtual desktop to the client, so as to build a remote connection between the client and the virtual desktop.

Figure 4:
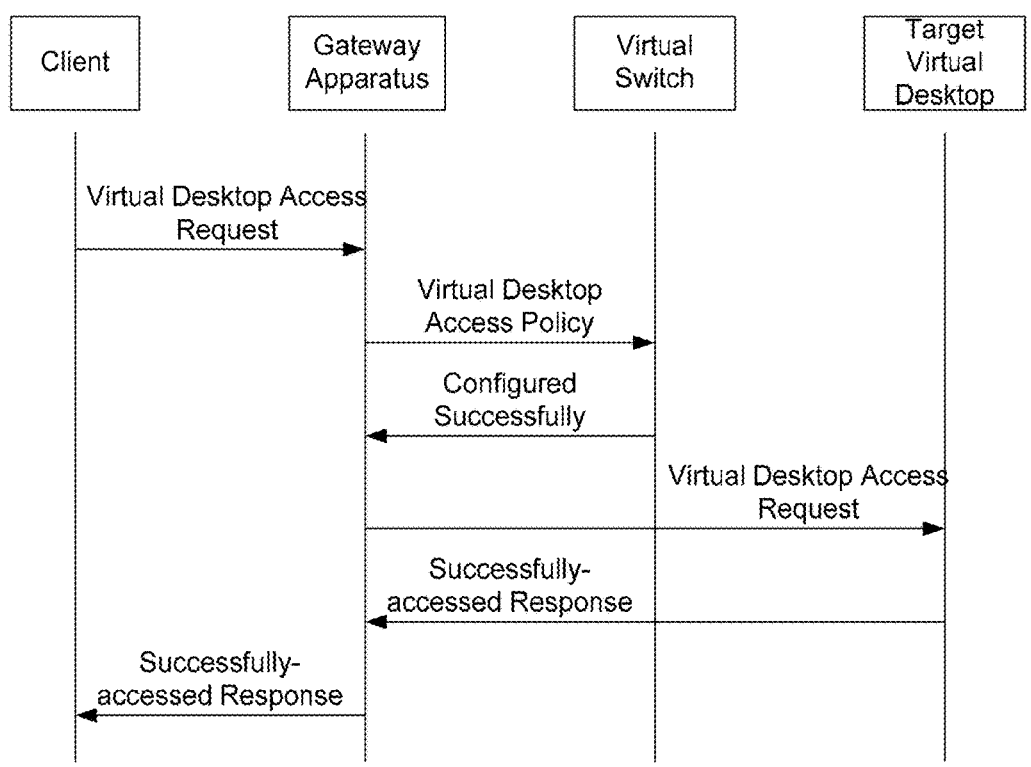
FIG. 4 is an interactive flowchart illustrating the interactive procedures between a client, a gateway apparatus, a virtual switch, and a virtual desktop when the client requests an access to the virtual desktop according to an example of the present disclosure.

FIG. 4 is an interactive flowchart illustrating the interactive procedures between a client, a gateway apparatus, a virtual switch, and a virtual desktop when the client requests an access to the virtual desktop according to an example of the present disclosure.

After the virtual desktop disconnection request transmitted from the client is received, the gateway apparatus will forward the virtual desktop disconnection request to the virtual desktop, and the virtual desktop will return a successfully-disconnected packet. After the successfully-disconnected packet is received, the gateway apparatus will send the predetermined virtual desktop default access policy to the virtual switch so as to make the virtual switch recover default settings. The virtual desktop default access policy is usually configured by the network administrator according to actual requirements, and its role is to reset the virtual switch after the client disconnected. The virtual desktop default access policy is not limited in the present disclosure. After the virtual desktop default access policy is successfully distributed (that is, after the successfully-configured message returned by the virtual switch is received), the gateway apparatus will forward the successfully-disconnected packet to the client, thereby successfully disconnecting the remote connection between the client and the virtual desktop.

Figure 5:
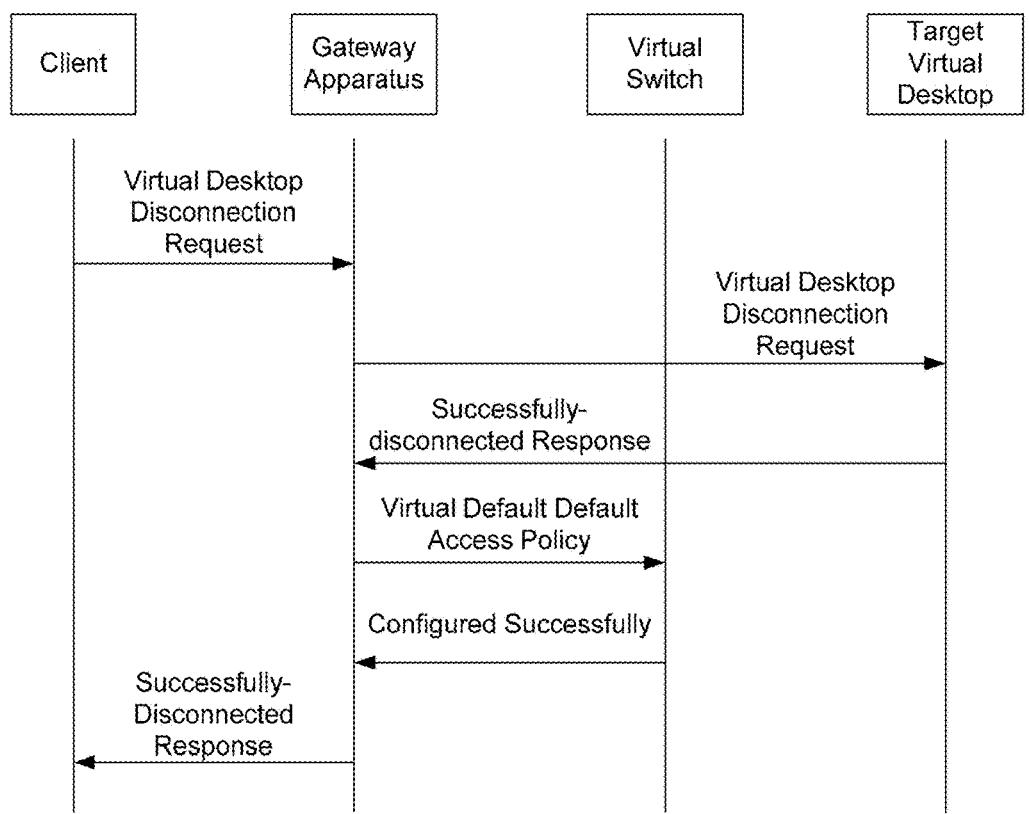
FIG. 5 is an interactive flowchart illustrating the interactive procedures between a client, a gateway apparatus, a virtual desktop, and a virtual desktop when the client ends an access to the virtual desktop according to an example of the present disclosure.

FIG. 5 is an interactive flowchart illustrating the interactive procedures between a client, a gateway apparatus, a virtual switch, and a virtual desktop when the client ends an access to the virtual desktop according to an example of the present disclosure.

By configuring the corresponding relationship between the client's IP address and the virtual desktop access policy in the gateway apparatus, the virtual desktop access policy will be sent to the virtual switch which accesses the target virtual desktop if the client wants to access the virtual desktop. Therefore, the virtual switch can control the virtual desktop's authority for reading/writing data, so as to control the client to access the accessible data only, which can improve the corporate information security.

The figures are only illustrations of an example, wherein the units or procedure shown in the figures are not necessarily essential for implementing the disclosure. The units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the disclosure.

Throughout the disclosure, the word "comprise", or variations such as "comprises" or "comprising", will be understood to imply the inclusion of a stated element, integer, block, or group of elements, integers, block, but not the exclusion of any other element, integer or block, or group of elements, integers or blocks.

Numerous variations and/or modifications may be made to the above-described embodiments, without departing from the broad general scope of the disclosure. The embodiments are, therefore, to be considered in all respects as illustrative and not restrictive.

The invention claimed is:

1. A virtual desktop access method, applied in a gateway apparatus including a hardware processor, comprising:
   receiving, by the gateway apparatus, a virtual desktop access request from a client;
   determining, by the gateway apparatus, a location of a source address of the virtual desktop access request;
   obtaining, by the gateway apparatus, a virtual desktop access policy according to the source address of the virtual desktop access request;
   determining, by the gateway apparatus, a virtual switch according to a destination address of the virtual desktop access request, wherein the destination address is an address of a virtual desktop that is connected to the virtual switch;
   sending, by the gateway apparatus, the virtual desktop access policy to the virtual switch, such that the virtual switch is allowed to control a level of access which the virtual desktop has to access network resources, wherein the level of access to the network resource is based on the location of the source address;
   receiving, by the gateway apparatus, the level of access of the virtual desktop determined by the virtual switch;
   forwarding, by the gateway apparatus, the virtual desktop access request to the virtual desktop;
   receiving, by the gateway apparatus, a first response to the virtual desktop access request from the virtual desktop; and forwarding, by the gateway apparatus, the first response to the client.

2. The method according to claim 1, wherein the virtual desktop access request is forwarded to the virtual desktop after receiving a confirmation that the virtual switch has received the virtual desktop access policy.

3. The method according to claim 1, further comprising:
receiving, by the gateway apparatus, a virtual desktop disconnection request from the client;
sending, by the gateway apparatus, a virtual desktop default access policy of the virtual desktop to the virtual switch; and
forwarding, by the gateway apparatus, the virtual desktop disconnection request to the virtual desktop, receiving a second response to the virtual desktop disconnection request from the virtual desktop, and forwarding the second response to the client.

4. The method according to claim 3, wherein the virtual desktop access request comprises: a Remote Desktop Protocol (RDP) connection request or a Simple Protocol for Independent Computing Environment (SPICE) connection request; and the virtual desktop disconnection request comprises: a RDP disconnection request or a SPICE disconnection request.

5. The method according to claim 1, wherein the source address of the virtual desktop access request comprises at least one of: a source Internet Protocol (IP) address and a source Media Access Control (MAC) address.

6. The method according to claim 1, wherein the virtual switch is included in a server where the virtual desktop is located.

7. The method according to claim 1, wherein the source address of the virtual desktop access request is an Internet Protocol (IP) address, and IP addresses in the same network segment correspond to the same virtual desktop access policy.

8. A non-transitory computer readable storage medium on which is stored machine readable instructions that when executed by a processor cause the processor to:
receive a virtual desktop access request from a client,
obtain a virtual desktop access policy according to a source address of the virtual desktop access request, and
determine a virtual switch according to a destination address of the virtual desktop access request, wherein the destination address is an address of a virtual desktop that is connected to the virtual switch;
send the virtual desktop access policy to the virtual switch, such that the virtual switch is allowed to control a level of access which the virtual desktop has to access network resources, wherein the level of access to the network resource is based on the location of the source address; and
determine the level of access of the virtual desktop by the virtual switch;
forward, the virtual desktop access request to the virtual desktop,
receive a first response to the virtual desktop access request from the virtual desktop, and
forward the first response to the client.

9. The non-transitory computer readable storage medium according to claim 8, wherein the machine readable instructions are further to cause the processor to:
forward the virtual desktop access request to the virtual desktop after receiving a confirmation that the virtual switch has received the virtual desktop access policy.

10. The non-transitory computer readable storage medium according to claim 8, wherein the machine readable instructions are further to cause the processor to:
receive a virtual desktop disconnection request from the client;
send a virtual desktop default access policy of the virtual desktop to the virtual switch; and
forward the virtual desktop disconnection request to the virtual desktop, receive a second response to the virtual desktop disconnection request from the virtual desktop, and forward the second response to the client.

11. The non-transitory computer readable storage medium according to claim 10, wherein the virtual desktop access request comprises: a Remote Desktop Protocol (RDP) connection request or a Simple Protocol for Independent Computing Environment (SPICE) connection request; and the virtual desktop disconnection request comprises: a RDP disconnection request or a SPICE disconnection request.

12. The non-transitory computer readable storage medium according to claim 8, wherein the source address of the virtual desktop access request comprises: at least one of a source Internet Protocol (IP) address and a source Media Access Control (MAC) address.

13. The non-transitory computer readable storage medium according to claim 8, wherein the virtual switch is included in a server where the virtual desktop is located.

14. The non-transitory computer readable storage medium according to claim 8, wherein the source address of the virtual desktop access request is an Internet Protocol (IP) address, and the IP addresses in the same network segment correspond to the same virtual desktop access policy.

* * * * *